United States Patent [19]

Novak

[11] Patent Number: 5,011,890
[45] Date of Patent: * Apr. 30, 1991

[54] POLYACETAL RESINS CONTAINING NON-MELTABLE POLYMER STABILIZERS

[75] Inventor: Ernest R. Novak, Vienna, W. Va.

[73] Assignee: E. I. du Pont de Nemours and Company, Wilmington, Del.

[ * ] Notice: The portion of the term of this patent subsequent to Mar. 21, 2006 has been disclaimed.

[21] Appl. No.: 327,664

[22] Filed: Mar. 17, 1989

[51] Int. Cl.$^5$ .................... C08F 283/06; C08K 5/47; C42L 61/00
[52] U.S. Cl. .................... 525/154; 525/401
[58] Field of Search .................... 525/154, 401

[56] References Cited

U.S. PATENT DOCUMENTS

| | | | |
|---|---|---|---|
| 3,204,014 | 8/1965 | Green | 260/895 |
| 3,210,322 | 10/1965 | Polly et al. | 260/45.95 |
| 3,215,671 | 11/1965 | Melby | 260/67 |
| 3,219,727 | 11/1965 | Kray et al. | 260/874 |
| 3,235,531 | 2/1966 | Walker | 260/45.95 |
| 3,236,929 | 2/1966 | Jupa et al. | 264/328 |
| 3,281,499 | 10/1966 | Dolce et al. | 260/874 |
| 3,338,872 | 8/1967 | Kiss et al. | 260/72 |
| 3,366,561 | 1/1968 | Marans | 204/159.21 |
| 3,418,280 | 12/1968 | Orgen | 260/67 |
| 3,470,135 | 9/1969 | Ishida | 260/67 |
| 3,518,326 | 6/1970 | Forsberg | 260/828 |
| 4,098,843 | 7/1978 | Johnson | 260/857 F |
| 4,230,606 | 10/1980 | Amann et al. | 260/6 |
| 4,464,435 | 8/1984 | Hattori et al. | 428/409 |
| 4,522,735 | 6/1985 | Chasar | 252/49.9 |
| 4,555,357 | 11/1985 | Kausga et al. | 252/511 |
| 4,596,847 | 6/1986 | Kasuga et al. | 524/220 |
| 4,640,949 | 2/1987 | Wagman | 524/227 |
| 4,657,970 | 4/1987 | Shiraki et al. | 525/57 |
| 4,657,971 | 4/1987 | Shiraki et al. | 525/57 |
| 4,766,168 | 8/1988 | West | 524/377 |
| 4,814,397 | 3/1989 | Novak | 525/154 |

FOREIGN PATENT DOCUMENTS

| | | |
|---|---|---|
| 0245962 | 11/1987 | European Pat. Off. . |
| 3715117 | 12/1984 | Fed. Rep. of Germany . |
| 427107 | 9/1967 | Japan . |
| 43-14329 | 6/1968 | Japan . |
| 59-213752 | 5/1983 | Japan . |

Primary Examiner—John C. Bleutge
Assistant Examiner—W. R. H. Clark

[57] ABSTRACT

Incorporation into polyacetal molding compositions of 0.05-3 weight percent of certain non-meltable polymers containing formaldehyde reactive hydroxyl groups, formaldehyde reactive nitrogen groups, or formaldehyde reactive hydroxyl and formaldehyde reactive nitrogen groups, wherein the polymer has an average particle size, both prior to melt processing with the polyacetal and after melt processing with the polyacetal, of less than 10 microns, results in improved thermal stability of such compositions.

24 Claims, No Drawings

POLYACETAL RESINS CONTAINING NON-MELTABLE POLYMER STABILIZERS

BACKGROUND

1. Technical Field

This invention relates to certain polyacetal compositions which are characterized by improved stability during processing. Polyacetal compositions are generally understood to include compositions based on homopolymers of formaldehyde, the terminal groups of which are end-capped by esterification or etherification, as well as copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Compositions based on polyacetals of relatively high number average molecular weight, e.g., 10,000 to 100,000, are useful in preparing semi-finished and finished articles by any of the techniques commonly used with thermoplastic materials, e.g., compression molding, injection molding, extrusion, blow molding, rotational molding, melt spinning, stamping and thermoforming. Finished articles made from such compositions possess desirable physical properties, including high stiffness, strength, low coefficient of friction, and good solvent resistance. However, in certain applications, it would be desirable to have greater stability during processing than has heretofore been possible with conventional polyacetal compositions or even with polyacetal compositions containing conventional stabilizers. The stabilizer of the present invention imparts such improved stability to the polyacetal resin. The stabilizer of the present invention is a polymer that is non-meltable at the temperature at which the polyacetal is melt processed, has a small number average particle size, both before and after melt processing, and contains formaldehyde reactive nitrogen groups or formaldehyde reactive hydroxyl groups or both.

2. Description of Related Art

Polymers containing nitrogen groups and/or hydroxyl groups have been known in the art to stabilize acetal resins. However, the particular thermal stabilizers of the present invention, which contain formaldehyde reactive hydroxyl groups and/or formaldehyde reactive nitrogen groups (said formaldehyde reactive nitrogen groups being predominantly present on the sides of the polymer backbone), and which also have a small number average particle size and are non-meltable at the temperature at which the polyacetal is melt processed, have not been taught in the art and, in some cases, have been taught away from by the art. In spite of the teachings in the art, which are highlighted below, the particular stabilizers of the present invention significantly improve the stability of polyacetal resins.

Japanese Patent Application Publication 42-7107, published Sept. 11, 1967 by applicant Teijin K. K., discloses a composition of polyoxymethylene or copolymer composition comprising polyoxymethylene polymer or its copolymer and a copolymer of acrylamide and styrene or vinyl napthalene. It is required that the copolymer of acrylamide and styrene or vinyl napthalene have a melting point equal to or below the melting point of the polyoxymethylene polymer or copolymer. The reference teaches away from the use of a non-meltable polymer stabilizer. It also teaches that acrylamide homopolymer is only slightly compatible with polyoxymethylene polymer or copolymer, is not thermally stable, causes considerable discoloration, and has only a slight effect for improving the heat stability or other properties of polyacetal.

Japanese Patent Publication Koho 43-14329, published June 17, 1968 by applicant Mitsubishi Kasei Kogyo K. K., discloses a method of stabilizing formaldehyde polymers consisting of an addition of a copolymer of acrylamide or an acrylamide derivative. There is no teaching that acrylamide homopolymer is a stabilizer for polyacetal, nor is there recognition in this reference of the importance of the non-meltable nature of the stabilizer or of its particle size in achieving improvements in thermal stability of the magnitude achieved herein.

Japanese Patent Application Publication Kohai 59-213752, published May 19, 1983 by applicant Asahi Kosei Kogyo K. K., discloses a polyacetal composition containing a fine poly-beta-alanine powder as a heat stabilizer, wherein the poly-beta-alanine is obtained by hydrogen transfer polymerization of acrylamide. Hydrogen transfer polymerization yields nylon-3, wherein the majority of formaldehyde reactive nitrogen groups are in the backbone of the polymer. The reference teaches away from preparation of a polymer stabilizer having a high degree of formaldehyde reactive nitrogen groups on the sides of the polymer backbone by disclosing that if less than 0.02 moles of the catalyst/mole of acrylamide is used, the vinyl polymer (i.e., polyacrylamide, wherein the formaldehyde reactive nitrogen groups are on the sides of the polymer backbone) tends to be generated at an undesirable degree. Further, there is no recognition of the particular parameters required for the polymer stabilizers of the present invention. Even further, in an application later filed by Asahi (i.e., West German Published Application No. P3715117.7, discussed below), it is stated that the stabilizers of this reference are still inadequate with regard to heat resistance and the absence of discoloration under heat.

West German Published Application No. P3715117.7, published Dec. 3, 1984 by Asahi Kasei Kogyo K. K., discloses a thermal stabilizer for polyacetal purported to be improved over that of the Japanese 59-21375 reference. In this particular reference, there is disclosed as a thermal stabilizer for polyacetal a poly-beta-alanine compound containing:

(X) monomer units having the formula

—(CH$_2$CH$_2$CONH)— and (Y) monomer units having the formula

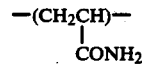

characterized in that the content of monomer units (Y) lies in the range from 1.4 to 10 mM per gram of the compound, preferably from 5 to 9 mM per gram of the compound. This reference clearly teaches away from a high percentage of (Y) monomer units, as evidenced by the preferred range of (Y) monomer units and by the statement that excellent characteristics cannot be obtained if poly-B-alanine (corresponding to poly-X) is merely mixed with a polyacrylamide (corresponding to poly-Y). This indicates that poly-Y, by itself, is not effective without interaction from poly-X. The reference also does not recognize the importance of the particular parameters of the present invention.

European Patent Application Publication No. 0 245 962, published Nov. 19, 1987 by applicant E. I. du Pont de Nemours and Co., Inc. (inventor E. R. Novak) discloses a thermal stabilizer for polyacetal consisting of polymers and oligomers containing both hydroxyl groups and at least one other functional group that is a stronger Lewis base than the hydroxyl groups. Excessively high stabilizer viscosity (from molecular weight or chemical composition) is undesirable because it can make it difficult to disperse the stabilizer in the polyacetal. U.S. Pat. No. 4,766,168, issued Aug. 23, 1988 to N. E. West and assigned to E. I. du Pont de Nemours and Co., Inc. discloses a thermal stabilizer for polyacetal consisting of hydroxy containing polymers and hydroxy containing oligomers. Neither reference recognizes the importance of the stabilizer particle size and the non-meltable nature of the stabilizer with respect to obtaining thermal stability of the magnitude demonstrated herein.

U.S. Pat. No. 3,204,014, granted Aug. 31, 1965 to Green, discloses a thermally stable polyacetal composition comprising a polyacetal and a ternary stabilizer system comprised of (a) a copolymer of N-vinylpyrrolidone and a monoolefinic monomer copolymerizable therewith, (b) a phenolic antioxidant, and (c) a diester of 3,3′-thiodipropionic acid. There is no recognition of the importance of the average particle size or the non-meltable nature of the stabilizer.

U.S. Pat. No. 3,219,727, granted Nov. 23, 1965 to Kray, discloses polyoxymethylene compositions having enhanced heat stability due to the incorporation therein of a vinyl polymer having side chains containing the structure

and particularly containing groups of the class consisting of amide groups and lactam groups. Although there is disclosed in this reference stabilizers for polyacetal containing nitrogen groups, there is no recognition of the importance of small number average particle size in this reference, nor is there recognition that the stabilizer should be non-meltable, nor is there exemplified any of the particular stabilizers of the present invention, said stabilizers having a small number average particle size and being non-meltable.

U.S. Pat. No. 3,235,531, granted Feb. 15, 1966 to Walker, discloses a method for stabilizing oxymethylene copolymer. U.S. Pat. No. 3,210,322, granted Oct. 5, 1965 to Polly discloses a method of treating a trioxane polymerization product comprised of an oxymethylene polymer, a trioxane polymerization catalyst, and unreacted trioxane. U.S. Pat. No. 3,236,929, granted Feb. 22, 1966 to Jupa, discloses a method of injection molding oxymethylene copolymers. U.S. Pat. No. 3,418,280, granted to Orgen, discloses a method of stabilizing a polymer which is susceptible to thermal degradation because it contains monomeric units susceptible to degradation. In the above four references, the oxymethylene polymer or copolymer may contain thermal stabilizers such as substituted polyacrylamides or compounds having 1–6 amide groups. None of the references recognize the particular parameters of the present invention, nor do any exemplify the particular stabilizer of the present invention.

U.S. Pat. No. 4,230,606, granted Oct. 28, 1980 to Amann, discloses a melamine-formaldehyde polycondensate as a thermal stabilizer for polyoxymethylene. It is advantageous to form the melamine-formaldehyde precondensate in the presence of one or more protective colloids, which may include copolymers of acrylamide. There is no suggestion that copolymers of acrylamides are stabilizers for polyacetal.

None of the references discussed or listed above disclose the particulars of the present invention nor do any exemplify the specific stabilizers claimed herein.

SUMMARY OF THE INVENTION

This invention relates to certain polyacetal compositions stabilized with 0.05 to 3 weight percent of certain polymer stabilizers containing formaldehyde reactive hydroxyl groups and/or formaldehyde reactive nitrogen groups, said polymer stabilizers having a number average particle size, in the polyacetal, of less than ten microns and being non-meltable in that the polymer stabilizers have a major melting point higher than the temperature at which the polyacetal is melt processed or, in the alternative, they are non-meltable if the major melting point is lower than the temperature at which the polyacetal is melt processed, but the polymer stabilizers do not undergo significant melt flow during the melt processing of the polyacetal. The above weight percent is based upon the weight of the polyacetal and the polymer stabilizer. The formaldehyde reactive nitrogen groups, when present, are present such that the amount of formaldehyde reactive nitrogen groups on the sides of the polymer backbone is at least three times as great as the amount of said groups, if any, present in the backbone of the polymer stabilizer. The small particle size of the polymer in the polyacetal is due to the polymer having a small number average particle size, i.e. less than 10 microns, prior to melt processing with the polyacetal. This small number average particle size may be obtained during the polymerization of the monomers or comonomers for the polymer stabilizer or it may be obtained subsequent to the polymerization, but prior to melt processing. In any event, the polymer stabilizer has an average particle size of less than 10 microns prior to melt processing with the polyacetal. The polymer stabilizers are melt processed with the polyacetal at a temperature above the melting point of the polyacetal and below the temperature at which significant degradation of the components of the polyacetal composition occurs. The resultant polyacetal compositions are characterized by improved stability during melt processing.

DETAILED DESCRIPTION OF THE INVENTION

This invention relates to certain polyacetal compositions which are characterized by improved processing stability. The term "polyacetal" as used herein includes homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

It has been found that polyacetals can be formulated into compositions having improved processing stability. More specifically, when polyacetals are melt processed with certain polymers containing formaldehyde reactive hydroxyl groups and/or formaldehyde reactive nitrogen groups, said polymers having a number average particle size of less than 10 microns, both before and after melt processing with the polyacetal and being non-meltable at the temperature at which the polyacetal is melt processed, the resulting compositions are characterized by improved processing stability as measured by, for example, lower evolution of formaldehyde, improved mold deposit, improved color retention, improved melt stability, and reduced contamination.

Typical commercially available polyacetal compositions are stabilized with polyamide (such as disclosed in Alsup et al., U.S. Pat. No. 2,993,025). Polyamides can react with formaldehyde released during processing, resulting in the reaction products and/or decomposition products contaminating the molded article. The stabilizers used in the compositions of the present invention do not degrade or form contamination as readily as the conventional nylon stabilizers. In addition, they provide improved processing stability to the polyacetal when subjected to long heating times. Further, they result in polyacetal compositions having reduced mold deposit.

The polyacetals used in the compositions of the present invention can be branched or linear and will generally have a number average molecular weight in the range of 10,000 to 100,000, preferably 20,000 to 75,000. The molecular weight can conveniently be measured by gel permeation chromatography in m-cresol at 160° C. using a Du Pont PSM bimodal column kit with nominal pore size of 60 and 1000 A. Although polyacetals having higher or lower molecular weight averages can be used, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

As indicated above, the polyacetal can be either a homopolymer, a copolymer, or a mixture thereof. Copolymers can contain one or more comonomers, such as those generally used in preparing polyacetal compositions. Comonomers more commonly used include alkylene oxides of 2-12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyacetal homopolymer is preferred over copolymer because of its greater stiffness and strength. Preferred polyacetal homopolymers include those whose terminal hydroxyl groups have been end-capped by a chemical reaction to form ester or ether groups, preferably acetate or methoxy groups, respectively.

The polymer stabilizer used in the compositions of the present invention is a homopolymer or copolymer containing formaldehyde reactive nitrogen groups, formaldehyde reactive hydroxyl groups, or both formaldehyde reactive nitrogen and formaldehyde reactive hydroxyl groups. By "formaldehyde reactive" it is meant that the hydroxyl group contains an oxygen with a hydrogen atom bonded to it and the nitrogen group contains a nitrogen with one or two hydrogen atoms bonded to it. Formaldehyde will react with the —OH or the —NH bonds of the stabilizer polymer. These reactive sites are referred to herein as formaldehyde reactive sites. It is preferred that the polymer stabilizer contain formaldehyde reactive nitrogen or hydroxyl groups having the maximum number of formaldehyde reactive sites. For example, a polymer stabilizer containing formaldehyde reactive nitrogen groups wherein there are two hydrogen atoms attached directly to the nitrogen atom (i.e., two formaldehyde reactive sites in the group) is preferred over one containing formaldehyde reactive nitrogen groups wherein there is only one hydrogen atom attached directly to the nitrogen atom (i.e., one formaldehyde reactive site in the group).

The polymer stabilizer has at least ten repeat units. It preferably has a weight average molecular weight of greater than 5,000, most preferably greater than 10,000. Higher weight average molecular weights are most preferred and further, such higher weight average molecular weights may be advantageous for reducing mold deposit formation.

The polymer stabilizer is non-meltable at the temperature at which the polyacetal is melt processed. By the term "non-meltable", it is meant that the polymer stabilizer has its "major melting point" above the temperature at which the polyacetal is melt processed and thus remains essentially a solid during melt processing of the polyacetal. Alternatively, a polymer stabilizer is "non-meltable" if the polymer stabilizer has its "major melting point" below the temperature at which the polyacetal is melt processed but it does not undergo significant melt flow at that temperature. The melt flow rate of the polymer stabilizer may not be significant because the polymer stabilizer has a high viscosity, attributed to, for example, high molecular weight or crosslinking. In the case where the polymer stabilizer has its "major melting point" below the temperature at which the polyacetal is melt processed, the melt flow rate of the polymer stabilizer, as measured in accordance with ASTM-D 1238, is preferably less than one-tenth that of the polyacetal. The "major melting point" of the polymer stabilizer can be determined on a differential scanning calorimeter. "Major melting point" is the temperature at which the amount of heat absorbed, by the polymer stabilizer, is greatest; i.e., it is the temperature at which the polymer stabilizer shows the greatest endotherm.

Polyacetals are usually melt processed at melt temperatures of about 170°-260° C., preferably 185°-240° C., most preferably 200°-230° C. The polymer stabilizer should be non-meltable at the particular temperature at which the polyacetal is melt processed.

The polymer stabilizer must also have a number average particle size of less than 10 microns after melt processing with the polyacetal. It further should have a number average particle size of less than 10 microns before melt processing with the polyacetal. It should be understood that a high degree of loose agglomeration of particles in the polymer stabilizer may occur during the preparation and isolation of the polymer stabilizer, such as, for example, during the drying of the polymer stabilizer. In order for one to obtain a true and accurate measurement of the number average particle size, prior to melt processing, for a polymer stabilizer containing a high degree of loose agglomerates, the loose agglomerates should be broken up prior to measuring the number average particle size of the polymer stabilizer or, alternatively, they should be discounted in making said measurement. Whether or not a polymer stabilizer contains a high degree of loose agglomerates can be determined by standard techniques of transmission electron microscopy. The details of determining the number average particle size, both before and after melt processing, are disclosed below.

The formaldehyde reactive hydroxyl groups can be incorporated into the polymer stabilizer by using an appropriate hydroxyl containing monomer, such as, for example, hydroxyl alkyl acrylates or methacrylates. Alternatively, the formaldehyde reactive hydroxyl groups can be generated on the polymer stabilizer by transforming another group into a hydroxyl group, such as, for example, by hydrolysis of esters or epoxides, or by reduction of carbonyl groups. Regardless of the methods by which the formaldehyde reactive hydroxyl groups are incorporated, the polymer stabilizer prepared therefrom must be non-meltable, or capable of being made non-meltable, at the temperature at which the polyacetal is melt processed.

Similarly, the formaldehyde reactive nitrogen groups can be incorporated into the polymer stabilizer by using an appropriate nitrogen containing monomer, such as, for example, acrylamide and methacrylamide. Preferred nitrogen containing monomers are those that result in the polymer stabilizer containing formaldehyde reactive nitrogen groups, wherein there are two hydrogen atoms attached to the nitrogen. The particularly preferred monomer is acrylamide which, when polymerized, results in a polymer stabilizer having substantially all of the formaldehyde reactive nitrogen groups attached directly as a side chain of the polymer backbone or indirectly as a side chain of the polymer backbone. Alternatively, the formaldehyde reactive nitrogen groups can be generated on the polymer stabilizer by modification of the polymer or copolymer. The formaldehyde reactive nitrogen groups may be incorporated by either method as long as the resultant polymer prepared therefrom is non-meltable, or is capable of being made non-meltable, at the temperature at which the polyacetal is melt processed.

The quantity of the formaldehyde reactive hydroxyl or nitrogen groups in the polymer stabilizer must be such that the atoms in the backbone to which the formaldehyde reactive groups are attached, either directly or indirectly, are separated from each other (i.e., connected to each other) by not more than twenty chain atoms. Preferably, the polymer stabilizer will contain at least one formaldehyde reactive hydroxyl or nitrogen group per each twenty carbon atoms in the backbone of the polymer. More preferably, the ratio of formaldehyde reactive hydroxyl or nitrogen groups to carbon atoms in the backbone will be 1:2–1:10, most preferably 1:2–1:5.

The formaldehyde reactive nitrogen groups should be present in the polymer stabilizer such that the amount of the formaldehyde reactive nitrogen groups as, or part of, the side chains of the polymer stabilizer backbone is at least 3 times, preferably at least ten times, the amount of the formaldehyde reactive nitrogen groups, if any, present in the backbone of the polymer stabilizer. In other words, the formaldehyde reactive nitrogen groups, attached directly or indirectly to the atoms in the backbone of the stabilizer polymer, should be at least three times as great, preferably at least ten times as great, as those in the backbone of the polymer stabilizer, if such are present. The formaldehyde reactive nitrogen groups attached directly or indirectly to the side of the polymer backbone are preferably present in a substantially greater quantity than the formaldehyde reactive nitrogen groups, if any, present in the polymer backbone. Most preferably, nearly one hundred percent of the formaldehyde reactive nitrogen groups are attached to the sides of the polymer backbone.

The polymer stabilizer can be a homopolymer or a copolymer, provided it is non-meltable. It is preferred that the polymer stabilizer be polymerized from acrylamide or methacrylamide monomer by free radical polymerization and that the polymer stabilizer prepared therefrom consist of at least 75 mole percent of a unit of the form

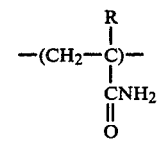

where R=hydrogen or methyl. More preferably, it consists of at least 90 mole percent of the above units, even more preferably, it consists of at least 95 mole percent of the above units, and most preferably, it consists of at least 99 mole percent of the above unit.

The polymer stabilizer may be a copolymer in that it is polymerized from more than one monomer. The comonomer may or may not contain formaldehyde reactive nitrogen and/or formaldehyde reactive hydroxyl groups. Examples of other monomers that may be thus incorporated include styrene, ethylene, alkyl acrylates, alkyl methacrylates, N-vinylpyrrolidone, and acrylonitrile. The polymer stabilizer that is a copolymer must still be non-meltable. It further must possess the required quantity of formaldehyde reactive hydroxyl and/or nitrogen groups, in the required ratio, and it must have the required number average particle size. The comonomer preferably should be added such that it does not unduly minimize the number of moles of formaldehyde reactive groups per gram of polymer stabilizer. Further, it should not unduly minimize the number of formaldehyde reactive sites per gram of polymer stabilizer.

Specific preferred stabilizers that are copolymeric include copolymers of hydroxypropyl methacrylate with acrylamide, methacrylamide, or dimethylaminoethyl methacrylate.

When the polymer stabilizer has a high number of formaldehyde reactive hydroxyl groups in comparison to the number of formaldehyde reactive nitrogen groups or, alternatively, when it has only formaldehyde reactive hydroxyl groups, it may be advantageous to include other groups in the stabilizer that are basic. This is because for optimum performance as a stabilizer for polyacetal, the stabilizer should be reactive with both formaldehyde and acid. Preferably, these other groups are nitrogen containing groups, such as amines, amides, ureas, and urethanes.

The polymer stabilizer must have a number average particle size of less than 10 microns, preferably less than 5 microns, and most preferably less than 2 microns, as measured before processing in polyacetal. Along with the polymer stabilizer being non-meltable, the number average particle size of the polymer stabilizer is important in achieving the improved stability for polyacetal demonstrated herein. If the stabilizer particle size is, on average, too large, then the interaction between the polyacetal and the polymer stabilizer can be negligible and the polymer stabilizer may have greatly reduced effectiveness. Stability is related to the interaction that occurs between the polyacetal and the polymer stabilizer and as such, it is desirable to have good interaction between the polyacetal and the polymer stabilizer. Maximizing the surface area/gram of polymer stabilizer increases interaction between the polymer stabilizer and the polyacetal. The surface area/gram of polymer stabilizer increases as the particle size of the polymer stabilizer decreases. Thus, a stabilizer with small particle size is highly desired.

If the stabilizer particle size is, on average, on the order of 10–100 microns, then the stabilizer may impart stability to the polyacetal but the physical properties of the articles manufactured from the polyacetal may be reduced. Relatively large particles may also cause uneven surface in the articles manufactured from polyacetal containing stabilizer with large particles. In some cases, it may however be desirable to produce articles with surfaces having reduced surface gloss. In that case, a stabilizer of large particle size, more near the upper limit of the number average particle size, may actually be preferred.

The small number average particle size of the stabilizer polymer may be obtained directly during the polymerization of the monomer or comonomers. To obtain the small average particle size, the stabilizer polymerization is carried out by conventional dispersion polymerization methods in an organic media or by conventional emulsion polymerization methods in water, the techniques of each of which are well known in the art. Whether the polymerization technique is dispersion polymerization or emulsion polymerization, the polymer stabilizer prepared therefrom should be insoluble in the polymerization media. Thus, the particular media selected for polymerization is dependent upon the particular monomer or comonomers chosen and the polymer that will result therefrom. For example, where acrylamide or methacrylamide is a monomer for polymerization, the preferred media is a lower alkyl alcohol. The polymerization may be by addition or condensation polymerization or free radical polymerization. The most preferred method is one that will result in the number of formaldehyde reactive sites in the formaldehyde reactive group being maximized. Generally, free radical polymerization is the preferred method of polymerization. Polymer stabilizer prepared from acrylamide is most preferably prepared by free radical polymerization. In any event, the polymerization method must be such that it results in a polymer stabilizer having formaldehyde reactive nitrogen groups or formaldehyde reactive hydroxyl groups in the quantities and amounts previously defined.

In some cases, the polymer stabilizer produced by the polymerization to small particle size will have a sufficient major melting point or have a sufficiently low melt flow rate such that it is non-meltable as polymerized. In other cases, the polymer stabilizer may not be non-meltable as polymerized but, prior to or during the melt processing in polyacetal, it will crosslink, due to, for example, application of heat, to a sufficiently high molecular weight such that it has a low melt flow rate and is non-meltable at the temperature at which the polyacetal is melt processed. Whether the polymer stabilizer will be non-meltable as polymerized or will become non-meltable after polymerization depends upon the nature of the particular monomer or comonomers being polymerized.

In some cases, the polymer stabilizer produced by the polymerization of the monomer or comonomers will not be non-meltable as polymerized and it will not become non-meltable subsequent to polymerization. This can be easily determined by measuring the melting point or melt flow rate of the stabilizer after it has been compounded with polyacetal. In such cases, it is desirable to include at least one monomer that crosslinks the polymer stabilizer either during polymerization or at a later time. Monomers that will cause crosslinking during polymerization include polyfunctional, unsaturated monomers, such as, for example, acrylates, methacrylates, acrylamides, and methacrylamides, and derivatives thereof. Specifically preferred monomers are ethylene glycol dimethacrylate and N,N'-methylenebisacrylamide. Monomers that may cause crosslinking after polymerization of the stabilizer polymer is complete include, for example, glycidyl methacrylate, acrylic acid, methacrylic acid, and derivatives thereof. The crosslinking monomer should be added in an amount that is sufficient to yield a polymer stabilizer that is non-meltable at the temperature at which the polyacetal is melt processed.

During the polymerization to small particle size in an organic media, with or without a crosslinking monomer, it can be advantageous to have a dispersing aid present. During the polymerization to small particle size in an emulsion, it can be advantageous to have an emulsifier present. Dispersing aids and the methods of preparing them are well known in the art. A description of the methods of making and choosing dispersing aids is included in *Dispersion Polymerization in Organic Media* (by K. E. J. Barrett, New York: John Wiley & Sons, 1975). Particularly preferred dispersing aids include polyethylene glycol and its derivatives, methyl methacrylate copolymers, and poly(oxypropylene)-poly(oxyethylene) glycol block copolymers. Emulsifiers and the method of preparing them are well known in the art. Emulsion polymerizations are discussed in *Emulsion Polymerization Theory and Practice* (by D. C. Blackley, New York: John Wiley & Sons, 1975).

The dispersant or dispersant solution or the emulsifier is added to the polymerization reaction vessel simultaneously with the monomer and polymerization medium, and, where applicable, comonomer and crosslinking monomer. When a dispersant or dispersant solution or emulsifier is added to the stabilizer, it is advantageous remove the dispersant or dispersant solution or emulsifier from the stabilizer polymer by washing the stabilizer polymer, after it is prepared, with a solvent in which the dispersant solution or dispersant or emulsifier is soluble but in which the polymer stabilizer is insoluble. This is particularly true if the dispersant or dispersant solution or emulsifier is known to destabilize polyacetal. If the dispersant or dispersant solution or emulsifier is not known to destabilize polyacetal, it may be advantageous to leave it in the stabilizer polymer as it can act to reduce any agglomeration of particles that may occur during the drying of the polymer stabilizer.

The small number average particle size of the polymer stabilizer may alternatively be obtained subsequent to the polymerization of the monomer or comonomers, while the polymer stabilizer is still in the polymerization medium or is in solution. In such cases, the small number average particle size of the stabilizer may be obtained by adding a crosslinking monomer to the polymer stabilizer in the polymerization medium, after which the stabilizer polymer becomes insoluble in the medium. Alternatively, the small number average particle size of the stabilizer may be obtained by adding a solvent in which the stabilizer polymer is insoluble to the polymer stabilizer in the polymerization medium. Similarly, the polymer stabilizer in the polymerization medium may be added to a solvent in which the polymer stabilizer is insoluble. Small number average particle size can be obtained by other known means of separating the polymer from the polymerization medium. It can be advantageous to use dispersing aids or emulsifiers such as those previously described to separate the stabilizer polymer from the polymerization medium.

Any method may be used to prepare the polymer stabilizer provided that such method will yield a polymer stabilizer having small particles, with a number average size less than 10 microns, prior to melt processing with polyacetal. Further, the small particles should be non-meltable at the temperature at which the polyacetal is melt processed and should not coalesce or agglomerate to such an extent that they are not readily dispersible in the polyacetal melt.

The number average particle size of the stabilizer before it is melt processed with polyacetal can be measured by any means capable of determining number average particle size. The preferred means is the MICROTRAC II SMALL PARTICLE ANALYZER (ANALYZER), manufactured by Leeds & Northrup. By this method, the polymer stabilizer is added to a liquid, such as, for example, 2-propanol, and shaken by hand to disperse the polymer stabilizer in the liquid. From this dispersion, the number average particle size for the polymer stabilizer is determined by the ANALYZER, as is described in the Examples herein. In some cases, a high concentration f loose agglomerates may have occurred during the preparation of the polymer stabilizer. In such cases, more intensive mixing may be desired in order to break up the loose agglomerates. An example of a device capable of providing such intensive mixing is a "POLYTRON" (sold by Brinckman Instruments).

The number average particle size of the stabilizer after it has been melt processed with polyacetal should be less than 10 microns, preferably less than 5 microns, and most preferably less than 2 microns. It can be measured by any technique capable of measuring number average particle size for particles in a polymer. The preferred method of measuring the number average particle size of the stabilizer in the polyacetal is by transmission electron microscopy, described in detail in the Examples herein.

It is important that the polymer or stabilizer used in the compositions of the present invention be substantially free of compounds which destabilize acetal resins.

In stabilizing ester-capped or partially ester-capped polyacetal homopolymer, the polymer stabilizer should be substantially free of basic materials which can destabilize the polyacetal. Basic impurities should preferably be removed to levels of not more than 50 ppm and most preferably to not more than 10 ppm. In stabilizing polyacetal copolymer or homopolymer that is substantially all ether-capped, higher concentrations of basic materials can be tolerated. In addition, it should be understood that if the impurity is only weakly basic relatively higher amounts can be tolerated.

In stabilizing both homopolymer and copolymer polyacetal, acidic impurities in the polymer stabilizer should be minimized. Acidic inpurities should preferably be removed to levels of not more than 50 ppm and most preferably to not more than 10 ppm. As with basic impurities, it should be understood that if the impurity is only weakly acidic, relatively higher amounts can be tolerated.

When acidic and/or basic impurities are present in the polymer stabilizer in amounts large enough to cause destabilization of the polyacetal compositions, the polymer stabilizer should be purified before it is introduced into the compositions of the present invention. Polymer stabilizers used in the compositions of the present invention can be purified by washing with an appropriate liquid, such as methanol and/or water. Polymer stabilizers prepared with dispersants or emulsifiers that have destabilizing effects because, for example, they are highly acidic or highly basic, can be purified by washing the stabilizer with a solvent in which the dispersants or emulsifiers are soluble and in which the polymer stabilizer is insoluble.

To achieve the improvements in thermal stability, the polymer stabilizer should be present in the compositions of the present invention in the amount of 0.05–3 weight percent, based on the amount of the polyacetal and the polymer stabilizer, preferably 0.15–1.5 weight percent and most preferably 0.2–1.0 weight percent. Higher amounts of the polymer stabilizer can be used and the thermal stability of the polyacetal may be improved; however, with increased loading of the polymer stabilizer, the physical properties of the polyacetal may decrease.

It should be understood that the compositions of the present invention can include, in addition to the polyacetal and the stabilizer polymer, other ingredients, modifiers, and additives as are generally used in polyacetal molding resins, including co-stabilizers (such as those disclosed in U.S. Pat. Nos. 3,960,984; 4,098,843; and 4,766,168), anti-oxidants, pigments, colorants, UV stabilizers, toughening agents, nucleating agents, and fillers. It should also be understood that some pigments and colorants can, themselves, adversely affect the stability of polyacetal compositions.

The compositions of the present invention can be prepared by mixing the polymer stabilizer, which has a number average particle size of less than 10 microns and which is non-meltable, or can be made non-meltable during processing, with the polyacetal polymer at a temperature above the melting point of the polyacetal polymer using any intensive mixing device conventionally used in preparing thermoplastic polyacetal compositions, such as rubber mills, internal mixers such as "Banbury" and "Brabender" mixers, single or multi-blade internal mixers with a cavity heated externally or by friction, "Ko-kneaders", multibarrel mixers such as "Farrel Continuous Mixers", injection molding machines, and extruders, both single screw and twin screw, both co-rotating and counter rotating, both intermeshing and non-intermeshing. These devices can be used alone or in combination with static mixers, mixing torpedoes and/or various devices to increase internal pressure and/or the intensity of mixing, such as valves, gate or screws designed for this purpose. Extruders are preferred. Of course, such mixing should be conducted at a temperature below which significant degradation of the polyacetal will occur. The polymer stabilizer in the composition after melt processing will have a number average particle size less than 10 microns.

Shaped articles can be made from the compositions of the present invention using any of several common methods, including compression molding, injection molding, extrusion molding, blow molding, rotational molding, melt spinning, and thermoforming. Injection molding is preferred. Examples of shaped articles include sheet, profiles, rod stock, film, filaments, fibers, strapping, tape tubing, and pipe. Such shaped articles can be post treated by orientation, stretching, coating, annealing, painting, laminating, and plating. Such shaped articles and scrap therefrom can be ground and remolded.

Processing conditions used in the preparation of the compositions of the present invention and shaped articles made therefrom include melt temperatures of about 170°-260° C., preferably 185°-240° C., most preferably 200°-230° C. When injection molding the compositions of the present invention, the mold temperature will generally be 10°-120° C., preferably 10°-100° C., and most preferably about 50°-90° C.

EXAMPLES

In the following examples, there are shown specific embodiments of the present invention and certain comparisons with embodiments of control experiments outside the limits of the present invention. It will be seen that the compositions of the present invention are characterized by improved stability. All temperatures are in degrees Celsius unless otherwise specified. Measurements not originally in SI units have been so converted and rounded where appropriate.

In the following examples, Initiator A was 2,2'-azo-bis-(isobutyronitrile) and Initiator B was 2,2'-azobis(2,4-dimethyl-valeronitrile).

In the following examples, total polymerization time was measured from the time at which the initiator was initially charged into the reaction vessel to the time when the polymerization was completed and heat was withdrawn from the vessel.

PREPARATION OF DISPERSANT SOLUTIONS AND DISPERSANTS

In the preparation of some of the exemplified stabilizers, a dispersant or dispersant solution was used. The dispersants and dispersant solutions were prepared as follows:

Dispersant Solution A

Dispersant Solution A was prepared by polymerizing 198.6 grams of methyl methacrylate and 2.0 grams of glycidyl methacylate in 1000 ml. of toluene using 0.8 grams of Initiator B. The polymerization temperature was maintained between about 78.1° C. and 83.6° C. The total polymerization time was 120 minutes. The resultant dispersant solution contained 13.2% polymer. The resultant polymer in the dispersant solution had an inherent viscosity of 0.066 as measured at a concentration of 0.5 grams of polymer in toluene.

Dispersant Solution B

Dispersant Solution B was prepared by polymerizing 495 grams of methyl methacrylate and 5.0 grams of glycidyl methacrylate in 2000 ml. of toluene using initially 1.2 grams of Initiator A. The polymerization temperature was maintained between about 88° C. and 95° C. Additional initiator, in increments of 0.6 grams, was charged into the polymerization vessel approximately every 10-15 minutes until the total amount of Initiator A added was 5.4 grams. The total polymerization time was 172 minutes. The resultant dispersant solution contained 19.04% polymer. The resultant polymer in the dispersant solution had an inherent viscosity of 0.088 as measured at a concentration of 0.5 grams of polymer in toluene.

Dispersant C

Dispersant C was a polyethylene glycol having a molecular weight of 8000.

Dispersant D

Dispersant D was a poly-(oxypropylene)-poly(oxyethylene) glycol block copolymer having an average molecular weight of 13,000.

Dispersant Solution E

Dispersant Solution E was prepared by first charging a reaction vessel with 200 grams of polyethylene glycol having a molecular weight of 8000 and 1200 ml. of toluene. The reaction medium was heated until 200 ml. of toluene was distilled. The reaction medium was then cooled to about 70° C., at which point 10 ml. of methacrylic anhydride and 1 ml. of dodecyl dimethylamine were added. The reaction medium was refluxed for about 2 hours and then cooled before use as a dispersant solution.

PREPARATION OF POLYMERIC STABILIZERS FOR POLYACETAL

The polymer stabilizers described below were all polymerized in a glass reaction vessel equipped with a stirrer, nitrogen inlet above the surface of the liquid, thermometer, and condenser.

For the polymer thermal stabilizers exemplified below, melting points were determined on a DUPONT Model 9900 DIFFERENTIAL SCANNING CALORIMETER (DSC) in a nitrogen atmosphere. To eliminate the possible effect of small amounts of moisture or solvents, each thermal stabilizer was first heated to 140° C. and held there for 10 minutes. The samples were cooled to about 25° C. and then heated at a rate of 20° C./minute up to 350° C. The temperature at which endotherms occurred was reported. Also reported was the amount of heat absorbed, in Joules/gram, at each respective endotherm. The major melting point was the temperature at which the greatest amount of heat, in Joules/gram, was absorbed.

For the polymer stabilizers exemplified below, the melt flow rate was measured at 200° C. under a load of 2.16 kilograms according to ASTM-D 1238 method. The stabilizer polymer was redried at 90° C. for 12 hours prior to measuring the melt flow rate. The stabilizer polymer was next loaded into the melt indexer and the indexer was kept plugged for 6 minutes while the stabilizer polymer was heated to test temperature. After 6 minutes, the plug was released and the melt flow rate was determined over three minutes intervals. The time intervals reported below were measured from the time the polymer stabilizer was loaded into the melt index.

Regarding the measurement of the melt flow rate, it is known that water and other liquids or low molecular weight solids have substantial effects on melt flow. Depending upon the technique used to isolate the polymer stabilizers in the examples below, dispersant, when used, may be retained with the stabilizer polymer. Prior to measuring the melt flow rate, the dispersant should be removed by washing the stabilizer with a liquid that is a solvent for the dispersant and is a non-solvent for the stabilizer. After washing, the stabilizer should be redried prior to testing.

Unless otherwise specified, for the polymer stabilizers exemplified below, particle size was measured prior to processing with polyacetal by adding about 0.1 grams of the stabilizer to about 15 ml. of 2-propanol in a test tube. The tube was shaken by hand and the particle size of the stabilizer in the resultant dispersion was measured on a MICROTRAC II SMALL PARTICLE ANALYZER (ANALYZER), Model 158705/158708, equipped with a 17 channel detector system that covered a particle size range of 0.17 to 60 microns. The ANALYZER printed the percent of particle volume that had a diameter of less than the given detector channel. From the diameter and particle volume, the number average particle size was calculated. In this calculation, the particle diameter for a given detector channel was approximated by the channel diameter. The number of particles in each channel was calculated by the following formula:

$$N = (10000 V\%)/(0.5236 d^3/6)$$

where N = number of particles in a given channel
V% = volume of particles in that channel
d = channel diameter By summing the number of particles in all 17 channels, the total number of particles was calculated. By multiplying the number of particles in a channel by 100, and dividing the result by the total number of particles, the percent of particles in each channel was calculated. To calculate the total number percent having a diameter of less than that channel, starting with the smallest diameter channel, a cumulative number percent was calculated by adding the number percent in all channels that had a diameter less than or equal to that particular channel. From this cumulative sum of number percents, the median number average particle size was calculated. It is this number that is reported as the particle size of the thermal stabilizers described below.

The major components of each polymer stabilizer described below are summarized in Table I, which follows the description of the nylon stabilizer.

Stabilizers 1-2. Polyacrylamide Polymer Stabilizer Prepared with a Dispersant Solution Stabilizer 1 was prepared by polymerizing 100 grams of acrylamide and 120 grams of Dispersant Solution A in 800 ml. of 2-propanol. The polymerization reaction was started at about 72° C. using an initial charge of 0.04 grams of Initiator A. Additional initiator was added, in increments of 0.04 grams, over the next approximately 185 minutes until the total amount of initiator added was 0.16 grams. Approximately 77 minutes after the initial charge of initiator was added, a solution of 200 grams of acrylamide in 500 ml. of 2-propanol and 25 ml. of water was fed into the reaction vessel over a period of about 72 minutes. Also during that time, an additional 35 ml. of Dispersant Solution A were fed into the reaction vessel. The polymerization temperature was maintained between about 71.7° and 77.0° C. The total polymerization time was about 202 minutes. The resulting polyacrylamide stabilizer dispersion was dried in a 60° C. vacuum oven.

Stabilizer 2 was prepared by polymerizing 300 grams of acrylamide and 150 ml. of Dispersant Solution E in 3000 ml. of 2-propanol. The polymerization reaction was started at about 72° C. using an initial charge of 0.15 grams of Initiator A. Additional initiator was added, in increments of 0.03 grams, over the next approximately 200 minutes until the total amount of initiator added was 0.45 grams. Approximately 20 minutes after the initial charge of initiator was added, 78 ml. of a solution of 50 ml. of Dispersant Solution E in 100 ml. of methanol solution were fed into the reaction vessel over a period of about 160 minutes. The polymerization temperature was maintained between about 72° and 75.8° C. The total polymerization time was about 240 minutes. The resulting polyacrylamide stabilizer dispersion was filtered to collect the polymer stabilizer. The polymer stabilizer was washed with 2-propanol and then dried in a 60° C. vacuum oven.

DSC analysis on the polymer stabilizer showed a small endotherm of 8.3 Joules/gram at 59.6° C. This is due to the melting of the polyethylene glycol dispersant, which, by itself, showed an endotherm of 168.4 Joules/gram at 64.9° C. DSC analysis on the polymer stabilizer showed a second endotherm of 8.8 Joules/gram at 178.8° C. The major melting point was 264.0° C., with an endotherm of 217.2 Joules/gram. The melt flow rate, in grams/10 minutes, was as follows: 0.223 at 6-9 minutes; 0.143 at 9-12 minutes; and no flow at 12-15 minutes. The number average particle size was 0.5 microns.

Stabilizers 3-7. Homopolymer Stabilizer Prepared with a Cross-linking Monomer and a Dispersant Solution Stabilizer 3 was prepared by polymerizing 298.5 grams of acrylamide with 2.13 grams of glycidyl methacrylate and 250 ml. of Dispersant Solution A in 1600 ml. of 2-propanol. The polymerization reaction was started at about 71° C. using an initial charge of 0.05 grams of Initiator A. Additional initiator was added in increments of 0.05 and 0.02 grams, over the next approximately 240 minutes until the total amount of initiator added was 0.21 grams. Approximately 55 minutes after the initial charge of initiator was added, a solution of 298.6 grams of acrylamide and 2.13 grams of glycidyl methacrylate in 360 ml. of methanol was fed into the reaction vessel over a period of about 33 minutes. Also, at approximately 55 minutes after the initial charge of initiator was added, an additional 170 ml. of Dispersant Solution A were fed into the reaction vessel over a period of about 48 minutes. The polymerization temperature was maintained between 71° and 80° C. The total polymerization time was about 315 minutes. After the polymerization reaction was complete, about 1000 ml. of heptane were added to the reaction vessel. The resultant polyacrylamide stabilizer dispersion was filtered to collect the polymer stabilizer. The polymer stabilizer was dried at 60° C. in a vacuum oven. The dried product was a very fine powder.

DSC analysis on the polymer stabilizer showed a small endotherm of 3.0 Joules/gram at 176.3° C. The major melting point was 282.2° C., with an endotherm of 252.8 Joules/gram. The melt flow rate, in grams/10 minutes, was as follows: no flow at 6-9 minutes. The number average particle size was 0.8 microns.

Stabilizer 4 was prepared by polymerizing 299 grams of methacrylamide, 200 ml. of Dispersant Solution B, and 1.0 gram of N,N'-methylenebisacrylamide in 1600 ml. of 1/1 (v./v.) 2-propanol/toluene. The polymerization reaction was started at about 72° C. using an initial charge of 0.1 grams of Initiator A. Additional initiator was added, in increments of 0.05 grams, over the next approximately 200 minutes until the total amount of initiator added was 0.41 grams. Approximately 18 minutes after the initial charge of initiator was added, an additional 45 ml. of Dispersant Solution B were fed into the reaction vessel over a period of about 90 minutes. The polymerization temperature was maintained between about 72° and 76° C. The total polymerization time was about 300 minutes. The resulting polymethacrylamide stabilizer dispersion was filtered in order to isolate the stabilizer polymer. The stabilizer polymer was washed with acetone and dried in a 60° C. vacuum oven.

DSC analysis showed that the polymer stabilizer had a major melting point of 289.73° C., with an endotherm of 321.6 Joules/gram. It had no detectable melt flow and it had a number average particle size of 0.8 microns.

Stabilizer 5 was prepared by polymerizing 99.75 grams of acrylamide, 0.25 grams of N,N'-methylenebisacrylamide, and 10 grams of Dispersant C in 500 ml. of 2-propanol. The polymerization reaction was started at about 71° C. using 0.04 grams of Initiator A. Additional initiator was added, in increments of 0.02 grams, over the next approximately 158 minutes until the total amount of initiator added was 0.12 grams. Approximately 4 minutes after the initial charge of initiator was added, 25 ml. of a solution of 5 grams of Dispersant C in 50 ml. of methanol solution were added over a period of about 78 minutes. The polymerization temperature was maintained between about 71° and 75° C. The total polymerization time was 203 minutes. After cooling to room temperature, 250 ml. of 2-propanol were added to the reaction vessel. The resulting polyacrylamide stabilizer dispersion was filtered to collect the stabilizer polymer. The stabilizer polymer was dried in a 60° C. vacuum oven.

DSC analysis showed a small endotherm of 12.26 Joules/gram at 59.1° C. This is due to the polyethylene glycol, which, by itself, showed a large endotherm of 168.4 Joules/gram at 64.9° C. DSC analysis further showed a small endotherm of 3.2 Joules/gram at 181.2° C. The major melting point was 268.4° C., with an endotherm of 180.7 Joules/gram. The melt flow rate, in grams/10 minutes, was as follows: 0.101 at 6–9 minutes; 0.043 at 9–12 minutes; and no flow at 12–15 minutes. The number average particle size was 1.3 microns.

Stabilizer 6 was prepared by polymerizing 498.75 grams of acrylamide, 1.25 grams of N,N'-methylenebisacrylamide, and 50 grams of Dispersant D in 2500 ml. of 2-propanol. The polymerization reaction was started at about 71° C. using an initial charge of 0.15 grams of Initiator A. Additional initiator was added, in increments of 0.03 grams, over the next approximately 130 minutes until the total amount of initiator added was 0.36 grams. Approximately 40 minutes after the initial charge of initiator was added, an additional 50 ml. of 2-propanol were added into the reaction vessel. The same was done at about 63 and 72 minutes. The polymerization temperature was maintained at about 71°–79° C. The total polymerization time was about 200 minutes. Next, 1000 ml. of heptane were added to the polymerization vessel. The resulting polyacrylamide stabilizer dispersion was filtered in order to isolate the stabilizer polymer. The stabilizer polymer was dried in a 60° C. vacuum oven.

DSC analysis showed that the polymer stabilizer had a small endotherm of 9.7 Joules/gram at 179.6° C. The major melting point was 232.3° C., with an endotherm of 290.1 Joules/gram. The melt flow rate, in grams/10 min. was as follows: no flow after 6–9 minutes. The number average particle size was 1.0 microns.

Stabilizer 7 was prepared by polymerizing 298.5 grams of acrylamide, 1.5 grams of N,N'-methylenebisacrylamide, and 36 grams of Dispersant C in 3000 ml. of 2-propanol. The polymerization reaction was started at about 72.5° C. using an initial charge of 0.15 grams of Initiator A. Additional initiator was added, in increments of 0.03 grams, over the next approximately 200 minutes until the total amount of initiator added was 0.45 grams. Approximately 20 minutes after the initial charge of initiator was added, 91 ml. of a solution of 20 grams of Dispersant C in 100 ml. of methanol solution were fed into the reaction vessel over a period of about 180 minutes. The polymerization temperature was maintained between about 72° and 76° C. The total polymerization time was 240 minutes. The reaction mixture was cooled to 25° C., at which point 250 ml. of 2-propanol were added. The resulting polyacrylamide stabilizer dispersion was filtered in order to isolate the polymer stabilizer. The polymer stabilizer was rinsed with 1000 ml. of 2-propanol and dried in a 60° C. vacuum oven.

DSC analysis showed that the polymer stabilizer had a small endotherm of 4.98 Joules/gram at 57.4° C., attributed to polyethylene glycol. DSC analysis further showed a second endotherm of 2.6 Joules/gram at 189.6° C. The major melting point was 291.3° C., with an endotherm of 114.5 Joules/gram. The melt flow rate, in grams/10 min., was as follows: 5.16 at 6–7 minutes, 4.12 at 7–8 minutes, and 4.03 at 8–9 minutes. The stabilizer had a number average particle size of 1.4 microns. This is the stabilizer that was melt processed with polyacetal in Table IV.

The polymer stabilizer was washed with hot methanol to remove the polyethylene glycol dispersant and it was then redried. DSC analysis on the washed polymer stabilizer showed a small endotherm of 2.6 Joules/gram at 187.0° C. The major melting point was 295.0° C., with an endotherm of 209.5 Joules/gram. The washed polymer stabilizer showed no flow at 6–9 minutes. This illustrates that the presence of dispersant may adversely affect melt flow rate measurements. The number average particle size was 1.4 microns.

Stabilizer 8 was prepared by polymerizing 396 grams of acrylamide, 4.0 grams of glycidyl methacrylate, and 200 ml. of Dispersant Solution B in 1800 ml. of 2-propanol. The polymerization reaction was started at about 72° C. using an initial charge of 0.1 grams of Initiator A. Additional initiator was added in 0.05 gram increments over the next 191 minutes until the total amount of initiator added was 0.35 grams. Approximately 15 minutes after the initial charge of initiator was added, an additional 40 ml. of Dispersant Solution B was fed into the reaction vessel over a period of about 87 minutes. At approximately 60, 75, 95, and 125 minutes after the initial amount of initiator was charged in the reaction vessel, 50 ml. increments (200 ml. total) of 2-propanol were added to the reaction vessel. The polymerization temperature was maintained between approximately 72° and 77° C. The total polymerization time was 260 minutes. The resultant dispersion was dried in a 70° C. vacuum oven.

DSC analysis showed that the polymer stabilizer had a small endotherm of 12 Joules/gram at 178.3° C. The major melting point was 301.2° C., with an endotherm of 166.3 Joules/gram. The melt flow rate, in grams/10 minutes, was as follows: 0.12 at 6-9 minutes; 0.08 at 9-12 minutes; and 0.10 at 12-15 minutes. The number average particle size was 0.9 microns.

Stabilizer 9 was prepared by polymerizing 289.5 grams of acrylamide, 1.5 grams of N,N'-methylenebisacrylamide, and 30 grams of Dispersant C in 3000 ml. of methanol. The polymerization reaction was started at approximately 63° C. using an initial charge of 0.15 grams of Initiator A. Another 0.15 grams of Initiator A were added approximately 20 minutes later. Further initiator additions were made in 0.03 gram increments during the next 180 minutes (i.e., 200 minutes after the initial charge of initiator) until a total of 0.49 grams were added. Approximately 20 minutes after the initial initiator addition, 77 ml. of 20 grams of Dispersant C in 100 ml. methanol solution were added over a period of 180 minutes. The polymerization temperature was maintained between 61° and 64° C. The total polymerization time was 240 minutes. The resultant dispersion was cooled to about 25° C. The stabilizer therein was collected by filtration, rinsed once with methanol, and dried in a 60° C. vacuum oven.

DSC analysis showed that the polymer stabilizer had a small endotherm of 9.2 Joules/gram at 194.6° C. The major melting point was 306.6° C., with an endotherm of 213.5 Joules/gram. The melt flow rate, in grams/10 minutes, was as follows: no melt flow after 6-9 minutes. The number average particle size was 1.9 microns.

Stabilizer 10. Copolymer Stabilizer Prepared with a Dispersant Solution and a Cross-linking Agent Stabilizer 10 was prepared by polymerizing 260 grams of acrylamide, 40 grams of hydroxyethyl methacrylate, 1.5 grams of ethylene glycol dimethacrylate, and 200 ml. of Dispersant Solution B in 1200 ml. of 2-propanol and 400 ml. of toluene. The polymerization reaction was started at about 70° C. using an initial charge of 0.1 grams of Initiator A. Additional initiator was added, in increments of 0.05 grams, over the next approximately 121 minutes until the total amount of initiator added was 0.3 grams. The polymerization temperature was maintained between 70° and 79° C. The total polymerization time was 205 minutes. The resulting polyacrylamide copolymer stabilizer dispersion was dried in a 70° C. vacuum oven.

DSC analysis showed that the polymer stabilizer had a small endotherm of 4.2 Joules/gram at 160.5° C. The major melting point was 287.7° C., with an endotherm of 261.8 Joules/gram. The melt flow rate, in grams/10 min., was as follows: no flow after 6-9 minutes. The number average particle size was 1.4 microns.

Stabilizers 11-12. Control Examples—Acrylamide Polymerized by Conventional Solution Polymerization Methods Stabilizers 11a and 11b were prepared by polymerizing acrylamide in water according to known methods, such as those described in *Preparative Methods of Polymer Chemistry*, by W. E. Sorenson and T. W. Campbell, Interscience Publishers, Inc.: New York (1961), p. 179.

Stabilizer 11a was prepared by charging 207.2 grams of acrylamide, 1658.8 grams of demineralized water, 30.8 grams of 2-propanol, and 0.384 grams of potassium persulfate into a 4 liter flask continually being flushed with about 50 ml./min of carbon dioxide. The reaction solution was stirred and heated, during which time the temperature in the reactor reached 78.2° C. The temperature was then maintained between 77.3° C. and 80.0° C. for two hours. At the end of the two hours, the reaction solution was a viscous polymer solution. About one-half of the viscous polymer solution was poured into a tray and dried in a 70° C. vacuum oven. This was Stabilizer 11a.

Stabilizer 11b was prepared by pouring about 200 ml. of the viscous polymer solution prepared above into about 600 ml. of rapidly stirred 2-propanol. The polymer then precipitated. It was washed three times with 2-propanol and dried in a 70° C. vacuum oven. This was Stabilizer 11b. DSC analysis showed it had a small endotherm of 76.13 Joules/gram at 191.8° C. The major melting point was 236.2° C., with an endotherm of 303.2 Joules/gram. The melt flow rate, in grams/10 min., was as follows: no flow at 6-9 minutes.

Both stabilizers were ground in a polymer mill so that the ground products passed through a 20 MESH screen. A 20 MESH screen has openings of 1.44 mm.

Stabilizer 12 was prepared by polymerizing 200.7 grams of acrylamide in 800 ml. of methanol. The polymerization reaction was started at about 54° C. using an initial charge of 0.1 gram of Initiator B. Another 0.1 gram of initiator was added about 57 minutes later. As the polymerization reaction proceeded, polymer started to precipitate. To keep the polymer in solution, 800 ml. of water was added to the reaction vessel. The polymerization temperature was maintained between 54.5 and 65° C. The total polymerization time was 150 minutes. The resulting polyacrylamide solution was dried in a 60° C. vacuum oven. The product appeared lumpy, was transparent and brittle, and was ground to about 0.5 mm size, as determined by visual inspection, prior to extrusion.

Stabilizer Nylon. Control Example

Nylon is a known thermal stabilizer for polyacetal. The nylon thermal stabilizer used in the following examples was a 33/23/43 nylon terpolymer of nylon 66, nylon 6/10, and nylon 6, respectively. Unless otherwise specified, it was ground prior to compounding with polyacetal. The ground nylon passed through a 20 MESH screen. A 20 MESH screen has openings of 1.44 mm.

TABLE I

| | | Major Components of Stabilizers 1-10 | | | | |
|---|---|---|---|---|---|---|
| Stabilizer No. | Monomer/ Comonomer | Dispersant Solution | Solvent in Dispersant Solution | Polymerization Medium | Crosslinking Monomer | Initiator |
| 1 | AAM | A | toluene | 2-propanol | — | A |
| 2 | AAM | E | toluene | 2-propanol | — | A |
| 3 | AAM | A | toluene | 2-propanol | GMA | A |

TABLE I-continued

| | Major Components of Stabilizers 1-10 | | | | | |
|---|---|---|---|---|---|---|
| Stabilizer No. | Monomer/ Comonomer | Dispersant Solution | Solvent in Dispersant Solution | Polymerization Medium | Crosslinking Monomer | Initiator |
| 4 | MAAM | B | toluene | 2-propanol/ toluene | MBAAM | A |
| 5 | AAM | C | — | 2-propanol | MBAAM | A |
| 6 | AAM | D | — | 2-propanol | MBAAM | A |
| 7 | AAM | C | — | 2-propanol | MBAAM | A |
| 8 | AAM | B | toluene | 2-propanol | GMA | A |
| 9 | AAM | C | — | methanol | MBAAM | A |
| 10 | AAM/HEMA | B | toluene | 2-propanol | EGMA | A |
| 11 | AAM | — | — | water | — | A |
| 12 | AAM | — | — | water/ methanol | — | B |

Legend
AAM = acrylamide
MAAM = methacrylamide
HEMA = hydroxyethyl methacrylate
GMA = glycidyl methacrylate
MBAAM = N,N'-methylenebisacrylamide
EGMA = ethylene glycol dimethacrylate

TESTING OF POLYMERIC STABILIZERS AND CONTROL EXAMPLES FOR POLYACETAL

The stabilizers prepared above were compounded with polyacetal homopolymer or copolymer and, unless otherwise stated, 0.1% hindered phenol antioxidant. Unless stated otherwise, the ingredients were compounded on a 5.08 cm. single screw extruder. The temperature of the melt as it exited the extruder was approximately 200° C.

The antioxidant used during extrusion was one of the following:

(1) Antioxidant A=tetrakis(methylene(3,5-di-tert-butyl-4-hydroxyhydrocinnamate))methane;

(2) Antioxidant B=triethyleneglycol bis(3-(3'-tert-butyl-4'hydroxy-5'-methylphenyl)propionate).

The polyacetal used for compounding and extrusion was one of the following (1) Polyacetal A=acetate capped polyoxymethylene homopolymer of about 65,000 number average molecular weight, having a melt flow rate, in grams/10 minutes, as follows: 2.58 at 6-9 minutes; 2.60 at 9-12 minutes; and 2.67 at 12-15 minutes;

(2) Polyacetal B=acetate capped polyoxymethylene homopolymer of about 45,000 number average molecular weight, having a melt flow rate, in grams/10 minutes, as follows: 16.60 at 6-8 minutes and 16.47 at 8-10 minutes;

(3) Polyacetal C=acetate capped polyoxymethylene homopolymer of about 30,000 number average molecular weight, having a melt flow rate, in grams/10 minutes, as follows: 20.40 at 6-7 minutes; 20.33 at 7-8 minutes; and 22.58 at 8-9 minutes;

(4) Polyacetal D=acetal copolymer extracted, using methanol, from Celcon ® M90-01 flake acetal copolymer, having a melt flow rate, in grams/10 minutes, as follows: 9.1 at 6-9 minutes; 11.2 at 9-12 minutes; and 10.1 at 12-15 minutes.

Melt flow rates were determined by the same procedure previously described.

The thermal stability of the polyacetal compositions containing the polymeric stabilizer, as well as the thermal stability of the control compositions, was determined using a thermally evolved formaldehyde (TEF) test procedure. A weighed sample of polyacetal composition was placed in a tube and the tube was fitted with a cap for introduction of nitrogen to the test sample for removal of any evolved gases from the apparatus while maintaining the sample in an oxygen-free environment. The tube that contained the sample was heated at 250° C. in a silicon oil bath. The nitrogen and any evolved gases transported thereby were bubbled through 75 ml of a 40 g/liter sodium sulfite in water solution. Any evolved formaldehyde reacts with the sodium sulfite to liberate sodium hydroxide. The sodium hydroxide was continuously neutralized with standard 0.1 N HCl. The results were obtained as a chart of ml of titer versus test time. The percent evolved formaldehyde was calculated by the formula $$(V)(N) \frac{0.03 \times 100}{SW}$$

where V = the volume of titer in milliliters
N = the normality of the titer, and
SW = the sample weight in grams.

The factor "0.03" is the milliequivalent weight of formaldehyde in g/milliequivalent. Thermal evolved formaldehyde results are conveniently reported after fifteen minutes and after thirty minutes heating. In some examples, it is reported on hourly increments up to and including 6 hours.

Also reported, where available, is the color of the composition after 60 minutes in the TEF test. The color was determined by visual inspection.

Particle size was determined from pellets of the polyacetal melt processed with the polymer stabilizer. Specifically, the pellet was sectioned using a Reichert-Jung Ultracut E model FC4E diamond knife microtome. Using standard −90° C. cryo-ultramicrotomy techniques, 90-120 nanometer sections of each sample were microtomed. The microtomed sections, still on the diamond blade, were picked off the diamond blade and mounted directly onto a copper transmission electron microscopy (TEM) grid. The sections, as mounted, were placed in a Denton vacuum evaporator model D V-502 and, under high vacuum, coated with a thin layer of spectroscopically pure carbon less than 20 nanometers thick. The carbon coating gives acetal sections more stability when exposed to the electron beam inside the transmission electron microscope. The carbon coated sections on the TEM grids were then examined using a Zeiss EMIOCR transmission electron microscope. Images were recorded at nominal magnifications of 1000x, 2520x, and 5000x on 70 mm (Kodak 5302), developed in Dektol, and printed. Magnification calibrations performed on an annual basis using a commercially available grating replica were combined with the photographic enlargement factor to give the final image magnification, which included 4640x, 11800x, and 23000x. The number average particle size was determined from the recorded images by measuring, with a ruler, the diameter of at least 50 particles, including large particles and any particles that may have agglomerated. Agglomerated particles were treated as one particle. The number average particle size was calculated by averaging the values obtained from the at least 50 particles.

Control Examples 1-4 and Examples 1-29

TEF test results for Polyacetal B alone and Polyacetal B with a varying concentration of the conventional nylon stabilizer are reported in Tables IIA-IIC, below, under Control Examples 1-6. The particular nylon control reported in each Table was the control that was run simultaneously with most, if not all, of the examples reported in the particular Table.

TEF test results for Polyacetal B plus the polymer stabilizers of the present invention are reported in Tables IIA-IIC, below, under Examples 1-29. The thermal stabilizers of the present invention significantly improved the thermal stability of polyacetal. Further, better thermal stability was achieved, on average, with the polymer stabilizers of the present invention than with the conventional nylon stabilizer, particularly at longer test times. The color of the compositions at 60 minutes was light tan with the stabilizers of the present invention and it was dark brown with the conventional nylon stabilizer. Finally, significantly better thermal stability was achieved with polyacrylamide stabilizers of the present invention, which had a small average particle size prior to compounding, than with polyacrylamide stabilizers that had a large average particle size (i.e., Control Examples 3a, 3b, and 4) prior to compounding.

Transmission electron microscopy showed the number average particle size of the polymer stabilizers of Examples 19 and 20 to be 1.0 and 0.8, respectively. In determining the number average particle size for the stabilizers processed in the polyacetal, agglomerates were treated as one particle.

TABLE IIA

Thermal Stability Results for Polyacetal B

| Example No. | Polyacetal | Thermal Stabilizer | Thermal Stabilizer Wt % | Antioxidant | TEF - % Formaldehyde 15 min | 30 min | 60 min |
|---|---|---|---|---|---|---|---|
| Control 1 | B | — | — | A | 1.54 | 2.74 | — |
| Control 2a | B | Nylon | 0.4 | A | 0.06 | 0.37 | 1.83 |
| Control 2b | B | Nylon | 0.6 | A | 0.07 | 0.35 | 2.25 |
| Control 2c | B | Nylon | 0.75 | A | 0.11 | 0.49 | — |
| Control 2d | B | Nylon | 0.8 | A | 0.09 | 0.35 | 2.31 |
| Control 2e | B | Nylon[iv] | 0.8 | B[v] | 0.09 | 0.38 | — |
| Control 3a | B | 11a | 0.5 | B[v] | 2.39 | 6.86 | — |
| Control 3b | B | 11b | 0.5 | B[b] | 1.31 | 4.65 | — |
| Control 4[i] | B | 12 | 0.48 | A | 0.93 | 4.20 | — |
| 1[ii] | B | 1 | 0.2 | A | 0.08 | 0.36 | 0.83 |
| 2 | B | 1 | 0.3 | A | 0.04 | 0.23 | 0.71 |
| 3 | B | 1 | 0.4 | A | 0.03 | 0.20 | 0.56 |
| 4 | B | 1 | 0.5 | A | 0.03 | 0.18 | 0.58 |
| 5 | B | 1 | 0.6 | A | 0.04 | 0.48 | 0.74 |
| 6 | B | 1 | 0.7 | A | 0.05 | 0.25 | 0.78 |
| 7 | B | 1 | 0.9 | A | 0.02 | 0.15 | 0.61 |
| 8 | B | 3 | 0.2 | A | 0.04 | 0.22 | 0.61 |
| 9 | B | 3 | 0.3 | A | 0.04 | 0.24 | 0.66 |
| 10 | B | 3 | 0.4 | A | 0.03 | 0.20 | 0.62 |
| 11 | B | 3 | 0.5 | A | 0.05 | 0.22 | 0.55 |
| 12 | B | 3 | 0.6 | A | 0.03 | 0.17 | 0.53 |
| 13 | B | 3 | 0.7 | A | 0.07 | 0.28 | 1.02 |
| 14 | B | 3 | 0.9 | A | 0.02 | 0.15 | 0.52 |
| 15 | B | 4 | 0.55 | B | 0.18 | 0.55 | — |
| 16 | B | 5 | 0.50 | A | 0.04 | 0.23 | — |
| 17[iii] | B | 6 | 0.625 | A | 0.10 | 0.45 | — |
| 18 | B | 10 | 0.55 | B | 0.04 | 0.18 | — |
| 19 | B | 8 | 0.5 | B[v] | 0.01 | 0.05 | — |
| 20 | B | 9 | 0.5 | B[v] | 0.03 | 0.22 | — |

Legend
[i]The extruded strand contained lumps of undispersed polyacrylamide
[ii]The stabilizer particle size in the extruded pellets was about 0.5 microns, as determined by Transmission Electron Microscopy
[iii]The extrusion was carried out on a 2.54 cm. diameter single screw extruder
[iv]Particle size was approximately 5 mm., as determined by visual inspection
[v]0.2 wt % added

TABLE IIB

Thermal Stability Results for Polyacetal B

| Example No. | Polyacetal | Thermal Stabilizer | Thermal Stabilizer Wt % | Antioxidant | TEF - % Formaldehyde 15 min | 30 min |
|---|---|---|---|---|---|---|
| Control 1 | B | — | — | A | 1.54 | 2.74 |
| Control 5 | B | Nylon | 0.8 | A | 0.02 | 0.23 |
| 21 | B | 1 | 0.25 | A | 0.03 | 0.17 |

TABLE IIB-continued

Thermal Stability Results for Polyacetal B

| Example No. | Polyacetal | Thermal Stabilizer | Thermal Stabilizer Wt % | Antioxidant | TEF - % Formaldehyde 15 min | 30 min |
|---|---|---|---|---|---|---|
| 22 | B | 1 | 0.35 | A | 0.05 | 0.18 |
| 23 | B | 1 | 0.45 | A | 0.04 | 0.15 |
| 24 | B | 3 | 0.25 | A | 0.02 | 0.12 |
| 25 | B | 3 | 0.35 | A | 0.02 | 0.10 |
| 26 | B | 3 | 0.45 | A | 0.01 | 0.10 |

TABLE IIC

Thermal Stability Results for Polyacetal B

| Example No. | Polyacetal | Thermal Stabilizer | Thermal Stabilizer Wt % | Antioxidant | TEF - % Formaldehyde 15 min | 30 min |
|---|---|---|---|---|---|---|
| Control 1 | B | — | — | A | 1.54 | 2.74 |
| Control 6 | B | Nylon | 0.79 | B$^{(i)}$ | 0.13 | 0.47 |
| 27 | B | 2 | 0.30 | B$^{(i)}$ | 0.10 | 0.36 |
| 28 | B | 2 | 0.40 | B$^{(i)}$ | 0.07 | 0.33 |
| 29 | B | 2 | 0.50 | B$^{(i)}$ | 0.05 | 0.28 |

Legend
$^{(i)}$0.2 wt % added

Control Examples 7–8 and Examples 30–38

TEF test results for Polyacetal A and Polyacetal C with the conventional nylon stabilizer are reported in Table III, below, under Control Examples 7–8.

TEF test results for Polyacetal A and Polyacetal C containing the thermal stabilizers of the present invention are reported in Table III, below, under Examples 30–38. At the 30 minute test time, the stabilizers of the present invention imparted better thermal stability, at a lesser concentration, to the polyacetal resin than did the conventional nylon stabilizer.

TABLE III

Thermal Stability Results for Polyacetals A and C

| Example No. | Polyacetal | Thermal Stabilizer | Thermal Stabilizer Wt % | Antioxidant | TEF - % Formaldehyde 15 min | 30 min |
|---|---|---|---|---|---|---|
| Control 7 | A | Nylon | 0.65 | A | 0.02 | 0.12 |
| Control 8 | C | Nylon | 0.8 | A | 0.07 | 0.30 |
| 30 | A | 1 | 0.25 | A | 0.01 | 0.07 |
| 31 | A | 1 | 0.35 | A | 0.01 | 0.04 |
| 32 | A | 1 | 0.45 | A | 0.03 | 0.06 |
| 33 | A | 3 | 0.25 | A | 0.03 | 0.10 |
| 34 | A | 3 | 0.35 | A | 0.01 | 0.05 |
| 35 | A | 3 | 0.45 | A | 0.01 | 0.05 |
| 36 | C | 3 | 0.25 | A | 0.03 | 0.13 |
| 37 | C | 3 | 0.35 | A | 0.03 | 0.13 |
| 38 | C | 3 | 0.45 | A | 0.03 | 0.14 |

Control Example 9 and Example 39

TEF test results for Polyacetal D (polyacetal copolymer) without thermal stabilizer are reported in Table IV, below, under Control Example 9. TEF test results for Polyacetal D with the thermal stabilizer of the present invention are reported in Table IV, below, under Example 39. The thermal stability of the polyacetal was significantly improved with the stabilizer of the present invention.

TABLE IV

Thermal Stability Results for Acetal Copolymer

| Example No. | Polyacetal | Thermal Stabilizer | Thermal Stabilizer Wt % | Antioxidant | TEF - % Formaldehyde 15 min | 30 min |
|---|---|---|---|---|---|---|
| Control 9 | D | — | — | A | 0.12 | 0.48 |
| 39 | D | 7 | 0.50 | A | 0.00 | 0.01 |

Examples 40–42

In examples 40–42, described in Table V, below, the TEF test was run for 6 hours and TEF values were obtained at every hour during that time period. In example 40, conventional nylon was the thermal stabilizer for polyacetal. Example 41, wherein polyacetal homopolymer was stabilized, and example 42, wherein polyacetal copolymer was stabilized, show that long term thermal stability of polyacetal is significantly improved, in comparison to the thermal stability achieved with a conventional nylon stabilizer, when there is used a thermal stabilizer of the present invention.

TABLE V

| | | Long Term Thermal Stability Test Results | | | | | | | | |
|---|---|---|---|---|---|---|---|---|---|---|
| Example No. | Polyacetal | Thermal Stabilizer | Thermal Stabilizer Wt. % | Anti-oxidant | TEF - % Formaldehyde | | | | | |
| | | | | | 1 hr | 2 hrs | 3 hrs | 4 hrs | 5 hrs | 6 hrs |
| 40 | B | Nylon | 0.60 | A | 2.48 | 12.35 | 18.96 | 23.52 | 27.00 | 29.94 |
| 41 | B | 3 | 0.35 | A | 0.37 | 0.82 | 1.27 | 1.77 | 2.33 | 2.90 |
| 42 | D | 7 | 0.50 | A | 0.06 | 0.21 | 0.33 | 0.47 | 0.63 | 0.81 |

I claim:

1. A thermoplastic polyacetal composition consisting essentially of
    (a) 0.05-3 weight percent of at least one non-meltable polymer selected from the group consisting of polymers containing formaldehyde reactive hydroxyl groups, polymers containing formaldehyde reactive nitrogen groups, and polymers containing both formaldehyde reactive hydroxyl groups and formaldehyde reactive nitrogen groups, provided that the atoms in the backbone of the polymer to which the formaldehyde reactive groups are attached, directly or indirectly, are separated from each other, on average, by not more than twenty chain atoms, and further provided that the amount of the formaldehyde reactive nitrogen groups attached, directly or indirectly, to the atoms which are in the backbone of the polymer is at least three times as great as the amount of formaldehyde reactive nitrogen groups present in the backbone of the polymer and
    (b) 97-99.95 weight percent of at least one polyacetal polymer,
    provided that the above-stated percentages are based on the total amount of components (a) and (b) only and further provided that the polymer of component (a) has a number average particle size in the composition of less than 10 microns.

2. The composition of claim 1 wherein the polyacetal is homopolymer and the polymer of component (a) is substantially free of acidic materials and basic materials.

3. The composition of claims 1 or 2 wherein the polymer of component (a) comprises 0.15-1.5 weight percent of the composition.

4. The composition of claims 1 or 2 wherein the polymer of component (a) comprises 0.2-1.0 weight percent of the composition.

5. The composition of claims 1 or 2 wherein the number average particle size of the polymer of component (a) in the composition is less than 5 microns.

6. The composition of claims 1 or 2 wherein the number average particle size of the polymer of component (a) in the composition is less than 2 microns.

7. The composition of claims 1 or 2 wherein the polymer of component (a) is characterized as having its major melting point higher than the temperature at which the polyacetal is melt processed.

8. The composition of claims 1 or 2 wherein the polymer of component (a) is characterized as having a melt flow rate substantially less than that of the polyacetal, said melt flow rate being determined at the temperature at which the polyacetal is melt processed.

9. The composition of claims 1 or 2 wherein the polymer of component (a) is characterized as having a melt flow rate less than one-tenth that of the polyacetal, said melt flow rate being determined at the temperature at which the polyacetal is melt processed.

10. The composition of claims 1 or 2 wherein the ratio of the formaldehyde reactive groups to carbon atoms in the backbone of the polymer of component (a) is in the range of 1:1-1:20.

11. The composition of claims 1 or 2 wherein the ratio of the formaldehyde reactive groups to carbon atoms in the backbone of the polymer of component (a) is in the range of 1:2-1:10.

12. The composition of claims 1 or 2 wherein the ratio of formaldehyde reactive groups to carbon atoms in the backbone of the polymer of component (a) is in the range of 1:2-1:5.

13. The composition of claims 1 or 2 wherein the amount of formaldehyde reactive nitrogen groups attached, directly or indirectly, to the atoms which are in the backbone of the polymer of component (a) is at least ten times greater than the amount of said groups present in the backbone of the polymer of component (a).

14. The composition of claims 1 or 2 wherein the polymer of component (a) is a polymer containing formaldehyde reactive nitrogen groups.

15. The composition of claims 1 or 2 wherein polymer of component (a) is a polymer containing both formaldehyde reactive nitrogen groups and formaldehyde reactive hydroxyl groups.

16. The composition of claim 14 wherein the polymer containing formaldehyde reactive nitrogen groups is polyacrylamide or polymethacrylamide.

17. The composition of claim 14 wherein the polymer containing formaldehyde reactive nitrogen groups is polyacrylamide wherein at least 90 mole percent of the repeat units are of the form

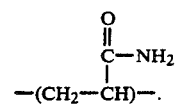

18. The composition of claims 1 or 2 wherein the polymer of component (a) is characterized as having its major melting point higher than the temperature at which the polyacetal is melt processed and wherein the polymer of component (a) is polyacrylamide having at least 90 mole percent of its repeat units of the form

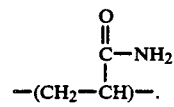

19. The composition of claims 1 or 2 wherein the polymer of component (a) is a copolymer of hydroxypropyl methacrylate and a comonomer selected from the group consisting of acrylamide, methacrylamide, or dimethylaminoethyl methacrylate.

20. The composition of claims 1 or 2 wherein the polymer of component (a) is a hydroxypropyl methacrylate/acrylamide copolymer.

21. The composition of claims 1 or 2 wherein the polyacetal polymer is a copolymer.

22. The composition of claims 1 or 2 wherein the polyacetal has a number average molecular weight of 10,000–100,000.

23. The composition of claims 1 or 2 further comprising at least one of co-stabilizers, antioxidants, pigments, colorants, reinforcing agents, UV stabilizers, nucleating agents, toughening agents, and fillers.

24. Shaped articles made from the composition of claims 1 or 2.

* * * * *